(12) United States Patent
Benner, Jr. et al.

(10) Patent No.: US 8,506,087 B2
(45) Date of Patent: Aug. 13, 2013

(54) LASER PROJECTOR HAVING SAFETY LENS FOR AUDIENCE SCANNING

(76) Inventors: William R. Benner, Jr., Longwood, FL (US); Jeremy Philip Turner, West Yorkshire (GB)

( * ) Notice: Subject to any disclaimer, the term of this patent is extended or adjusted under 35 U.S.C. 154(b) by 266 days.

(21) Appl. No.: 13/151,741

(22) Filed: Jun. 2, 2011

(65) Prior Publication Data

US 2011/0279880 A1 Nov. 17, 2011

Related U.S. Application Data

(63) Continuation-in-part of application No. 12/791,326, filed on Jun. 1, 2010, and a continuation-in-part of application No. 11/814,310, filed as application No. PCT/US2006/001988 on Jan. 9, 2006, now Pat. No. 7,756,174.

(60) Provisional application No. 61/324,014, filed on Apr. 14, 2010, provisional application No. 60/645,543, filed on Jan. 19, 2005.

(51) Int. Cl.
*G03B 21/00* (2006.01)
*H04N 9/31* (2006.01)
*H04N 9/10* (2006.01)
*H04N 3/02* (2006.01)
*H04N 3/28* (2006.01)
*H01S 3/10* (2006.01)
*G02B 26/08* (2006.01)
*G02B 26/10* (2006.01)
*G02B 17/00* (2006.01)

(52) U.S. Cl.
USPC .......... 353/46; 353/31; 348/744; 348/98; 348/195; 348/206; 348/266; 372/24; 359/727; 359/202.1

(58) Field of Classification Search
USPC ............ 353/46, 31; 348/744, 98, 195, 206, 348/266; 372/24; 359/727, 202.1
See application file for complete search history.

(56) References Cited

U.S. PATENT DOCUMENTS

| | | | |
|---|---|---|---|
| 4,006,970 | A | 2/1977 | Slater et al. |
| 5,130,838 | A | 7/1992 | Tanaka et al. |
| 5,546,139 | A | 8/1996 | Bacs, Jr. et al. |

(Continued)

FOREIGN PATENT DOCUMENTS

JP       2000194302       7/2000

OTHER PUBLICATIONS

Benner, Jr. William R., "New Tools for Eye-Safe Measurements," The Laserist, vol. 8, No. 2, pp. 11 and 14; Spring 1997.
Benner, Jr. William R., "Tools to Keep Audience Scanning Safe," The Laserist, vol. 8, No. 3, pp. 11-13; Summer 1997.

(Continued)

*Primary Examiner* — Georgia Y Epps
*Assistant Examiner* — Magda Cruz
(74) *Attorney, Agent, or Firm* — Allen, Dyer, Doppelt, Milbrath & Gilchrist, P.A.

(57) ABSTRACT

A laser light projector includes a laser beam generated by a laser light source, a scanner associated with the laser light source and having one or more moving mirrors capable of scanning the laser beam along X-Y coordinates, a scan-fail monitor and a safety-lens. The safety-lens includes at least one optical power, and is positioned and arranged for increasing the safety of the projected light within audience areas by increasing beam divergence in the audience, while keeping beam divergence low above the heads of the audience, thus allowing mirror targeting to occur.

19 Claims, 5 Drawing Sheets

(56) References Cited

U.S. PATENT DOCUMENTS

| | | |
|---|---|---|
| 6,580,560 B1 | 6/2003 | Benner, Jr. |
| 6,661,820 B1 | 12/2003 | Camilleri et al. |
| 6,831,763 B2 * | 12/2004 | Takakubo .................. 359/207.2 |
| 6,867,753 B2 | 3/2005 | Chinhammit et al. |
| 6,919,892 B1 | 7/2005 | Cheiky et al. |
| 7,190,329 B2 | 3/2007 | Lewis et al. |
| 7,301,558 B2 | 11/2007 | Gluck |
| 2002/0167974 A1 | 11/2002 | Kennedy et al. |
| 2005/0024704 A1 | 2/2005 | Sakai |
| 2006/0139319 A1 | 6/2006 | Kariathungal et al. |
| 2006/0139718 A1 * | 6/2006 | Ishihara ....................... 359/205 |
| 2007/0279494 A1 | 12/2007 | Aman et al. |

OTHER PUBLICATIONS

Benner, Jr. William R., "Evaluating Audience Scanning Effects," The Laserist, vol. 8, No. 4, pp. 8-9; Fall 1997.

Benner, Jr. William R., "Laserists Tackle Scanning Safety Issue," The Laserist, vol. 9, No. 4, pp. 5 and 18; Winter 1998.

Benner, Jr. William R., "Making Shows Safe and Enjoyable," Internet article; published in 1997, [online], Retrieved from the ILDA Technology website using Internet, <URL:http://www.laserist.org/ilda/showsafe.html>.

O'Hagan, "A Risk Assessment Methodology for the Use of Lasers in the Entertainment Industry," John B. O'Hagen Doctoral Thesis; Dec. 22, 1998; pp. 47-77.

* cited by examiner

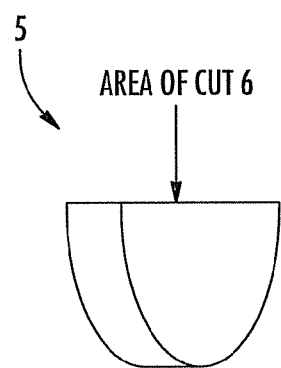
FIG. 3
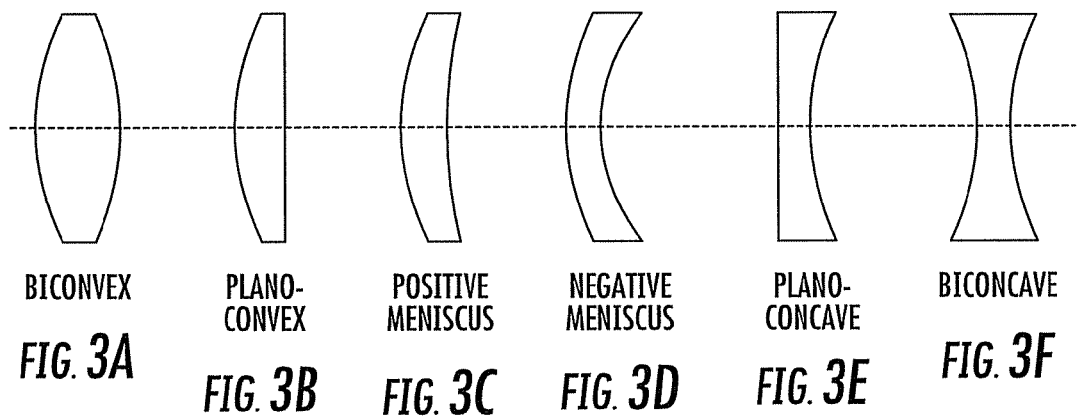
FIG. 3A BICONVEX
FIG. 3B PLANO-CONVEX
FIG. 3C POSITIVE MENISCUS
FIG. 3D NEGATIVE MENISCUS
FIG. 3E PLANO-CONCAVE
FIG. 3F BICONCAVE

US 8,506,087 B2

LASER PROJECTOR HAVING SAFETY LENS FOR AUDIENCE SCANNING

CROSS REFERENCE TO RELATED APPLICATIONS

This application is a continuation-in-part application of U.S. utility patent application Ser. No. 12/791,326 filed on Jun. 1, 2010 for "Laser Projector for Audience Scanning," which itself claims priority to U.S. Provisional Patent Application Ser. No. 61/324,014 for "Laser Projector and Safety Lens for Audience Scanning" having filing date Apr. 14, 2010 and is a continuation-in-part application of and claims priority to U.S. Utility patent application Ser. No. 11/814,310 for "Laser Projector for Audience Scanning" having filing date Jul. 19, 2006 filed in a National Phase Entry from Patent Cooperation Treaty Application PCT/US2006/001988 having filing date Jan. 9, 2006, which itself claimed priority to Provisional Patent Application Ser. No. 60/645,543 filed on Jan. 19, 2005 for "Audience Scanning Laser Projector," the disclosures of which are herein incorporated by reference in their entirety, and all commonly owned.

FIELD OF THE INVENTION

The present invention generally relates to the field of laser projectors, and more particularly, to a laser projector for safely projecting patterns and arrays of beams directly into an audience for entertainment display purposes.

BACKGROUND OF THE INVENTION

As described in U.S. Pat. No. 7,911,412 for an audience scanning light projector, the disclosure of which is herein incorporated by reference in its entirety, projectors for laser display can generally be categorized into one of three groups including graphics projectors, beam projectors, and audience scanning projectors.

Graphics projectors are those which project logos, text and other figures onto some projection surface such as a screen. To create images, these projectors typically employ an X-Y scanning system, usually including of two small mirrors mounted on galvanometer scanners. One mirror scans the beam in one linear direction (for example, horizontally) onto the second mirror, which scans the beam in the perpendicular direction (for example, vertically). The combined X-Y motion is normally used to draw outline-type vector images, using a point-by-point "connect the dots" styled method, according to software commands from a programmable controller operably connected with the laser projector. The audience views these figures on the screen in the same way that an audience would view a movie being projected onto a screen.

A beam projector produces beams of light that are projected into mid-air. The beams are viewable in mid-air by virtue of fog, dust and moisture that either exists in the air or which is created by the performer or venue. The beams are often animated to produce a dynamic effect. The beams can be moved and animated in a number of ways. For purposes of this invention, an X-Y scanning system is used by way of example. The scanning system may be identical to that of graphics projectors (the projector is merely aimed into the air instead of at a screen), or the scanning system may scan more slowly than that of graphics projectors (since complex images may not be required). Use of an X-Y scanning system allows flexibility to create both simple placement of the beam to hit target mirrors or objects and also to allow more complex patterns such as circles and shapes to be projected.

With both graphics and beam projectors, the generated light, typically a laser beam, does not come in contact with the audience. The light merely travels from the projector to its destination surface (in the case of graphics projectors), or along an uninterrupted path in mid air, and preferably exclusively above the heads of the viewing audience (in the case of beam projectors).

Audience scanning projectors typically combine features of both graphics and beam projectors. Audience scanning projectors use X-Y scanners to project geometric figures, patterns and arrays of light beams directly into a viewing audience. As with beam projectors, when the laser is projected toward an audience, its beam also illuminates any fog, dust, and moisture in the air. The beams may create dancing sculptures that are very pleasing to audience members and the beam comes in direct contact with the audience. The generated effect creates the illusion of being surrounded by a tunnel of light and by other geometric shapes that are formed by the light. One viewer has compared it to being inside a fireworks display, or at the bottom of a swimming pool filled with light.

Audience scanning projectors are often placed at a height of 3 meters, which is typically above the heads of all audience members. This is because the typical program material (image file data and abstracts) projected by audience scanning projectors uses the concept of a "horizon" to create certain shapes. It is known by laser show programmers that audience members will not reside above the horizon, and thus, certain patterns, such as non-moving beams may be placed there which are known to be above their heads. Likewise it is known that audience members will probably reside below the horizon, and therefore only sheets and cones and faster-moving patterns will typically be placed there.

In the case of each of the three projector types described above, the X-Y signals and beam power level signals are generated by a programmable controller which generally comprises a personal computer having suitable interface hardware, and running software for generating the images, patterns and shapes. The hardware generally includes an interface circuit board that connects to the computer. This interface circuit board includes digital-to-analog converters and voltage amplifiers, so that signals can be produced which correspond to X-Y beam positions, and to beam power levels. The X-Y beam positions and beam power levels produced by the interface hardware are sometimes referred to as "command signals," since these signals represent the software's intention for the projector to follow. The software program generates the X-Y beam positions and beam power level "command signals" and periodically transfers these as digital data to the digital-to-analog converters in the interface circuit board. Those skilled in the art will know that any suitable interface hardware and software may be used to control any of the three projector types mentioned above. However, in the present invention preferred hardware and software systems include the QuadMod™ series of hardware boards and Lasershow Designer™ series of laser software, both from Pangolin Laser Systems, Orlando, Fla.

When projecting a laser beam toward a viewer, eye safety is a major concern. If an intense laser beam were to stop scanning and directed on the pupil of a viewer's eye, retinal damage can occur if the beam has sufficiently high power and a sufficiently long dwell time. Likewise, even if the beam is not stopped but is scanned across the pupil of an eye, it can still cause retinal damage if the beam power is high enough, or if the beam is scanning slowly enough.

In audience scanning projectors in the current state of the art, the X and Y beam position signals generated by the X-Y scanners are mathematically differentiated to produce an output equivalent to X and Y beam velocity. The X and Y beam velocities are added together to produce the total beam velocity. This total beam velocity is monitored and compared to some pre-set minimum allowable velocity to make sure that the beam velocity is sufficiently high. If the beam were to stop scanning, producing zero velocity, or if the velocity were to otherwise drop below some preset threshold, this would be considered a "scanning failure." Under a scanning failure condition, the beam may be completely turned off by the light beam modulator or by a shutter. This type of system is called a "scan-fail monitor". Note that a scan-fail monitor is most often implemented in the form of analog signal conditioning components, but may also be implemented with computer hardware and software.

While scan-fail monitors provide some level of protection for the audience, there are a number of problems that still remain. First, a scan-fail monitor does not provide automatic power level control in different regions of the scan field. For example, scan fail monitors are not capable of allowing a higher power level over the audience's heads or below their eyes. Second, scan-fail monitors can be easily "fooled" into believing that there is a safe condition when there is not, because they only monitor the rate of change of position and do not track the actual position of the beam. By way of further example, if the beam alternates between two fixed locations, thereby concentrating 50% of the beam power in each position, the scan-fail monitor may allow this condition since the beam is technically scanning. However, in many instances, a 50% concentration of beam power could be hazardous. Therefore, there is a need for improvements for use of a scan-fail monitor alone.

It is well known in the art, an audience scanning projector of the current state of the art, typically generates a beam of light which is modulated. The modulation is performed either directly by the laser power supply, or externally by a modulator such as an acousto-optic modulator. After being modulated, the beam is directed to X-Y vector scanners and then projected directly into the audience. A scan-fail monitor may be used to detect if the scanning has stopped, or slowed to an unacceptably low level. Aside from the laser, modulator, shutter and X-Y scanners, typically no additional optical elements are used.

In this configuration, it could be said that the "raw laser beam" is used directly to illuminate audience members. However, a typical laser used for laser display applications has a beam diameter of 2 millimeters and divergence of around 1 milliradian. With this small size beam and low divergence, it is very possible that, during the scanning action, the entire laser beam will be smaller than 7 millimeters (which is the internationally-agreed-upon pupil diameter used for the purposes of safety evaluation) within the audience. Because the laser beam diameter is typically small in the audience, it means that no greater than around 5 milliwatts of laser power can be used to create the laser display, regardless of the sophistication of the scan-fail monitor. If a higher power is used, the display will not be able to meet Class 1 standards for laser safety.

Although it is not done very often, it is known in the art to use a lens within the beam path of an audience scanning laser projector. Such a lens may have its power at about −1.0 diopter. The lens can be placed between the modulated laser beam and the X-Y scanners, or immediately at the exit of the scanners. A lens whose power is negative will increase the divergence of the laser beam so that the beam diameter will be greater than 7 millimeters within the audience. When the beam is greater than 7 millimeters, it means that the entire beam will no longer fit through the pupil of a viewer's eye and thus, not all of the laser beam power will be delivered to the retina if the laser beam does land on someone's eye.

Light irradiance (which is the power per unit area) is governed by the "inverse square law", which states that, for a given beam power, if you double the beam diameter, the power-per-unit-area will be decreased by a factor of four. Thus the power-per-unit area decreases by the inverse-square of beam diameter. Since the irradiance of the laser beam has the greatest implication to laser safety, it can be shown that decreasing the irradiance by increasing divergence is the most effective means of increasing the safety of audience scanning projectors.

By using a lens with negative optical power to increase the divergence, this will decrease the power-per-unit area (irradiance) of the laser beam, thus making it possible to use a laser with higher than 5 milliwatts laser power, and still meet Class 1 standards for laser safety. In fact, by using a lens whose power is −1.0 diopters, the laser beam power can be increased to around 250 milliwatts for a typical size audience and typical distance from the laser projector.

The increased divergence allows for a higher power laser to be used—thus, this generally provides a much more dramatic and stunning laser light show. However, this approach is not without problems: Placing a lens with negative optical power before or after the scanners will decrease the divergence in all parts of the scan field, including above the heads of audience members. As stated above, laser projectors may be used for mirror targeting applications where the laser beam is directed to a mirror, to create a static beam sculpture. Typically a small beam is used for mirror targeting. The larger beam diameter caused by the lens makes such beam targeting virtually impossible. Another drawback is that, as the beam diameter is increased, the projected effect looks more cloudy and foggy, whereas the raw beam projected from the laser makes it look as though the light is cutting through the air like a knife.

It is also useful to have the lens located on a mounting arrangement external to the projector, so that if needed, the lens can be changed. However, an external mounting arrangement can also be tampered with. For example, if the laser projector is installed in a disco or night club, a rogue club operator or DJ might be tempted to completely remove the lens, thus allowing more intense and low-divergence beams to be projected everywhere, including into the audience. However, as noted above, low divergence beams projected into the audience would be potentially hazardous, especially if the power of the laser is greater than 5 milliwatts.

SUMMARY OF THE INVENTION

The present invention overcomes the drawbacks of prior art projectors by allowing the projection of laser beams with a small diameter and low divergence above the heads of the audience to aid in mirror targeting applications, while allowing the projection of laser beams with larger diameter and higher divergence within the audience, thus increasing safety.

In keeping with the teachings of the present invention, a laser projector for audience scanning may comprise a laser for emitting light beams, and a scanner operable with the laser for receiving the light beams and scanning the light beams along X-Y vector coordinates within first and second scan fields. A safety lens may be located downstream the scanner for receiving the scanned light beams that are substantially within only one of the first and the second scan fields. The light beams downstream the safety lens having a first divergence are projected above a viewing audience and the light beams downstream the safety lens having a second divergence greater than the first divergence are projected into the audience.

The safety lens may be formed from a simple lens having a central beam axis, wherein the simple lens is truncated along its central axis to form a half lens, and wherein a truncated edge portion of the half lens is generally aligned along a boundary defining the first and second scan fields to provide a change in beam divergence as the scanned beam move across the boundary between the first to the second scan fields.

Certain embodiments of the present invention also increase the safety of the laser projector by making it such that if the safety lens is removed, the laser projector will project high divergence beams everywhere and thus, the removal of the lens becomes a fail-safe arrangement, and also an arrangement which removes the motivation of rogue club operators and DJs to remove the external lens.

With the foregoing in mind, the present invention discloses a safe audience scanning projector that incorporates a laser, X-Y scanners, a scan-fail monitor and a safety lens. The safety lens may include at least one optical power (curvature), which is either applied to laser beams scanned above the horizon, or to laser beams scanned below the horizon. Due to the nature of the lens arrangement, there may be an abrupt change in beam diameter and beam divergence between the projection areas above and below the horizon. Moreover, the effective optical power applied either above or below the horizon may be zero, thus making that portion of the projection area function like a typical laser projector. The safety lens may be the only lens used in the projector, placed at the exit of the X-Y scanners, or the safety lens may be used along with an additional lens placed before the X-Y scanners.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 3 diagrammatically illustrates one safety lens in one possible embodiment of the present invention;

FIGS. 3A-3F illustrate various simple lenses operable with the present invention, wherein each lens may be truncated at its center line;

DETAILED DESCRIPTION OF THE EMBODIMENT

The present invention will now be described more fully hereinafter with reference to the accompanying drawings, in which embodiments of the invention are shown.

Unless otherwise defined, all technical and scientific terms used herein are intended to have the same meaning as commonly understood in the art to which this invention pertains and at the time of its filing. Although various methods and materials similar or equivalent to those described herein can be used in the practice or testing of the present invention, suitable methods and materials are described below. However, those skilled in the art should understand that the methods and materials used and described are examples and may not be the only ones suitable for use in the invention.

Moreover, it should also be understood that any temperature, weight, volume, time interval, range, concentration and any other measurements, quantities or numerical expressions given herein are intended to be approximate and not exact or critical values unless expressly stated to the contrary. Where appropriate to the invention and as understood by those of skill in the art, it is proper to describe the various aspects of the invention using approximate or relative terms and terms of degree commonly employed in patent applications, such as about, approximately, substantially, essentially, and generally comprising.

Further, any publications, patent applications, patents, and other references mentioned herein are incorporated by reference in their entirety as if they were part of this specification. However, in case of conflict, the present specification, including any definitions, will control. In addition, the materials, methods and examples given are illustrative in nature only and not intended to be limiting.

Accordingly, this invention may be embodied in many different forms and should not be construed as limited to the illustrated embodiments set forth herein. Rather, these illustrated embodiments are provided so that this disclosure will be thorough, complete, and will fully convey the scope of the invention to those skilled in the art. Other features and advantages of the invention will be apparent from the following detailed description, and from the claims.

Figure 1:
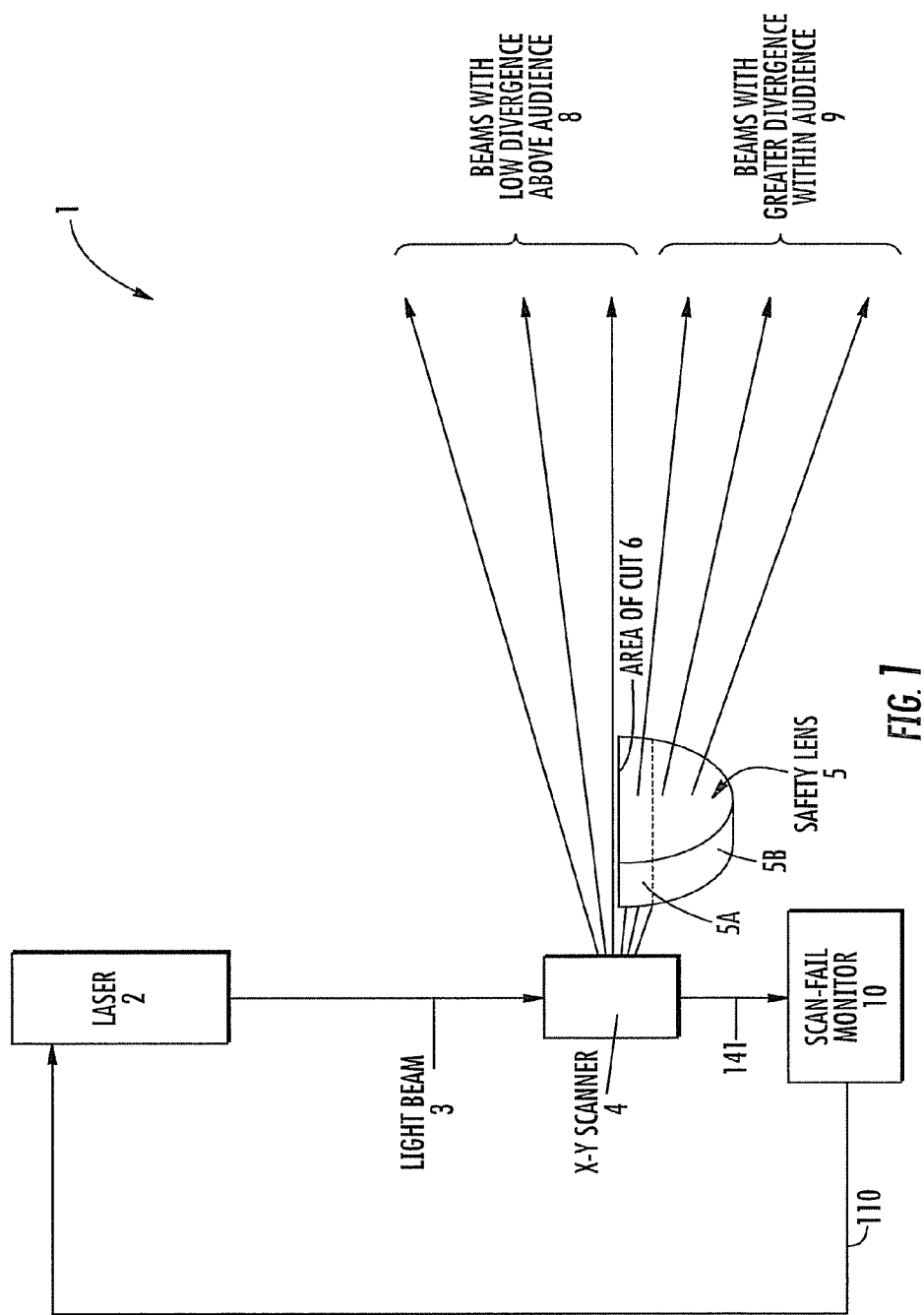
FIG. 1 is a diagrammatical illustration of one laser projector for scanning an audience according to the teachings of the present invention.

With reference initially to FIG. 1, one embodiment of the invention is herein described by way of example as a laser projection system 1 wherein a laser 2 generates a light beam 3, which is directed to a scanner 4, having one or more moving mirrors capable of scanning the laser beam along X-Y coordinates. A scan-fail monitor 10 is fed by an output 141 of the scanner 4, the output being indicative of the scanner position and/or velocity. While the system 1 and alternate systems are herein described using the scan-fail monitor 10, it will be clear to those of skill in the art that effective systems may be provided without use of the scan-fail monitor. The scan fail monitor 10 performs a calculation on the scanner output 141, and in turn outputs a fault signal 110 if the position and/or velocity of the scanner would lead to a hazardous condition, such as the scanning action being too slow or stopping within an audience area. The fault signal 110 reduces the power of laser 2 to a light level that would be safe under a fault condition. A safety lens 5 is positioned at the output of the scanner 4, in such a way that it affects beams projected generally where the audience will reside 9.

The safety lens 5 includes at least one optical power (curvature), and is intended to produce beams with higher divergence where the audience will reside 9. Due to its positioning at the output of scanner 4, the safety lens 5 generally will not affect beams projected above the horizon, and thus beams with low divergence will be projected above the audience 8. The safety lens as herein described by way of example is a simple lens and may be biconvex, plano-convex, positive meniscus, negative meniscus, plano-concave or biconcave, as will come to the mind of those skilled in the art when having the benefit of the teachings of the present invention.

Typical optical power for the lens 5 is between −0.5 diopters and −6.0 diopters. Although this is a typical range of optical powers, these values are not intended to be limiting.

One possible way of manufacturing the safety lens 5 may include providing a typical round or spherical lens with an optical power of at least −0.5 diopters and cutting it in half.

The area of the cut 6 may then be polished to provide a high-quality transparent section. The lens is then positioned in front of the scanner 4 in such a way as to be effective for beams projected into the audience 9. The optical power and manufacturing technique described here is only intended to be illustrative, and not limiting.

If the technique above were used, this would indeed create a safer laser projector than would be possible without the safety lens 5. The manufacturing technique of the present invention results in a projector that produces an abrupt change in the beam divergence as it crosses the line formed where the lens resides within the scan field. Tests with audiences have revealed that this abrupt change is not objectionable.

It is also possible that there could be multiple optical powers of the safety lens, 5 for example, one optical power where the scanner transitions 5A from the no-lens area to the lens area, and another optical power for the lowest portion 5B of the scan field, where audience members tend to be closer to the laser projector.

Within the embodiment illustrated with reference to the system 1, it is preferable that the safety lens 5 be made with negative optical power, because a negative optical power will increase divergence at all points between the output of the safety lens 5 and the audience. However, it is also possible to configure the safety lens 5 using a positive optical power, but there will be a converging effect before the beam begins to again diverge to provide beams with higher divergence in the audience 9. Thus, positive optical powers can be used as long as the audience is located at a sufficient distance from the laser projector to ensure that they are beyond the point of convergence.

With reference to FIG. 3, one embodiment of a truncated safety lens 5, 25 is diagrammatically illustrated, as will come to the mind of those skilled in the art, may be formed from a biconvex, plano-convex, positive meniscus, negative meniscus, plano-concave or biconcave lens, as illustrated with reference to FIGS. 3A-3F.

The safety lens 5 and area of the cut 6 may additionally be coated with a multi-layer, reflection free coating optimized for transmittance in the visible wavelengths.

Figure 4:
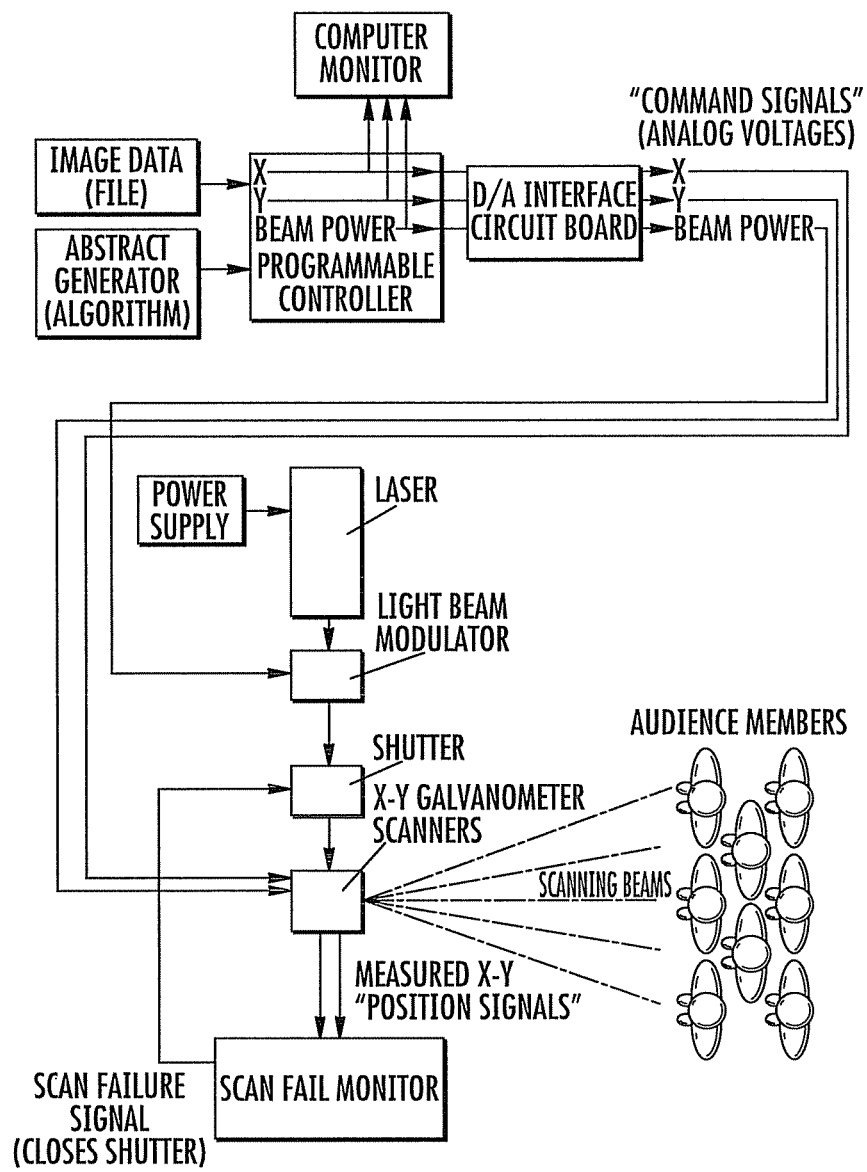
FIG. 4 shows a schematic diagram of an audience scanning laser projector.

The embodiment of the invention described above with reference to FIG. 4 provides a simple approach to create a projector for safe audience scanning, because it places the safety lens 5 at the exit of the scanner 4, and no additional lenses or adjustments are needed.

However, greater performance characteristics are achieved by using a second embodiment of the invention as illustrated with reference to FIG. 2 for the system. In this second embodiment, a laser 22 produces a light beam 23 which is directed through a lens 31 before being directed to the scanner 24. The scanner 24 includes one or more moving mirrors capable of scanning the laser beam along X-Y coordinates. A scan fail monitor 30 performs a calculation on the scanner output 241, which in turn outputs a fault signal 210 if the position and/or velocity of the scanner would lead to a hazardous condition, such as the scanning action being too slow or stopping in an audience area. Fault signal 210 reduces the power of laser 22 to a light level that would be safe under a fault condition. A safety lens 25 is positioned at the output of the laser scanner 24, in such a way that it affects beams projected around the area above the audience 28.

Figure 2:
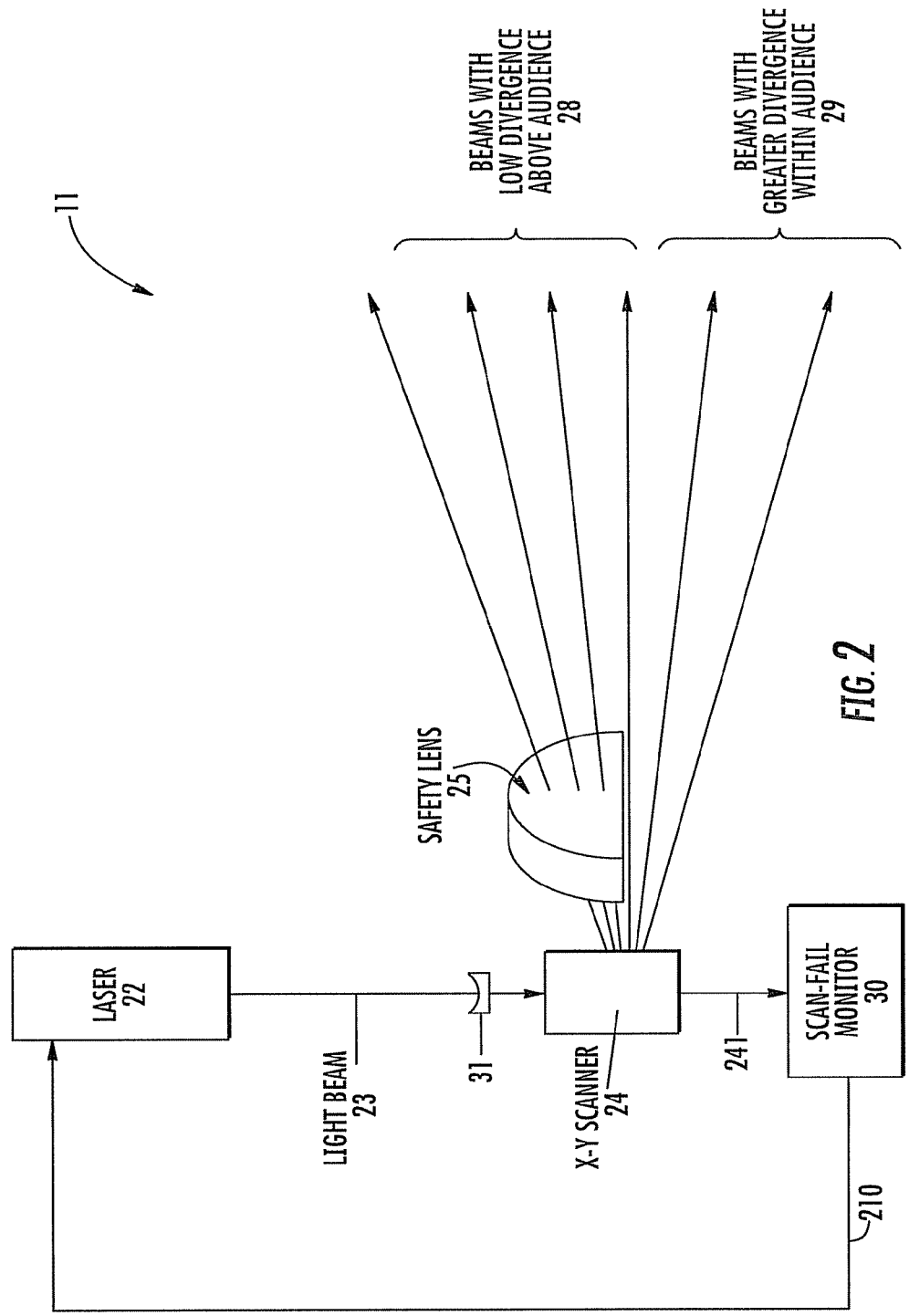
FIG. 2 is a diagrammatical illustration of another laser projector for scanning an audience according to the present invention.

With continued reference to FIG. 2, the safety lens 25 includes at least one optical power (curvature). The safety lens 25 is positioned in such a way that it does not exist within the lower portion of the output of scanner 24, and thus, the projector will provide beams with greater divergence where an audience will reside 29. The safety lens 25 is positioned in such a way that it affects beams projected around the upper portion of the scan field, and thus, the projector will provide beams with low divergence above the audience 28.

Within this embodiment for the system 11, it is preferable for the lens 31 to be configured to provide a negative optical power of, for example −2.0 diopters. It is also preferable to configure the safety lens 25 to have a positive optical power of, for example +2.0 diopters, thus the system 11 will project beams with low divergence above the audience 28. In fact, the safety lens 25 may be configured to provide completely collimated beams as long as the lens 31 is spaced appropriately from the scanner 24. In this configuration, the lens 31 having a negative optical power and the safety lens 25 having a positive optical power that is slightly greater than the negative power of the lens 31 will form an up-collimator, which reduces divergence even further when compared with that of the laser 22 itself. This is desirable for mirror targeting applications.

Up-collimators that comprise two lenses are known in the art, and are typically placed before the scanner. However, placing the single lens 31 before the scanner 24 and a second lens (the safety lens 25) after the scanner 24 provides a dual benefit. In this embodiment 11, the moving mirror on the scanner 24 does not have to be as big as would be the case with prior art up-collimator methods, and another benefit is provided by the fact that the safety lens 25 does not affect beams projected around where the audience resides 29.

Since the safety lens 25 is positioned in such a way as to only affect beams projected generally above the audience 28, the system will provide beams with higher divergence into the audience 29 because of the optical power of the lens 31.

Since it may be desirable for the safety lens 25 to be located externally to the projector and easily removable so that different optical powers may be used for different venues, it should be understood that this embodiment 11 increases the safety of the laser projector because the safety lens 25 is essentially a fail-safe component. If the safety lens 25 is removed, then high divergence beams will be projected everywhere because of the optical power of the lens 31.

As noted above, within this second embodiment, illustrated with reference to FIG. 2 for the system 11, it is preferable to have the lens 31 configured to provide a negative optical power, and the safety lens 25 configured to have a positive optical power. However, it is possible for lens 31 to provide a positive optical power, and also possible to configure the safety lens 25 to provide negative optical power. Many lens and optical configurations are possible and still remain within the scope of this invention as long as the system places beams with lower divergence above the heads of the audience 28, and beams with greater divergence within the audience 29.

The safety lens 25 may additionally be coated with a multi-layer, reflection free coating optimized for transmittance in the visible wavelengths.

Embodiments of the present invention may be driven by a computer or other pattern generator, not shown in FIG. 1 or 2 because such is common and well known in the art.

As above described, embodiments of the present invention overcome the drawbacks of prior art projectors by allowing the projection of laser beams with a small diameter and low divergence above the heads of the audience to aid in targeting applications, while allowing the projection of laser beams with larger diameter and higher divergence within the audience, thus increasing safety. A typical audience scanning projector is herein illustrated with reference to FIG. 4.

Figure 5:
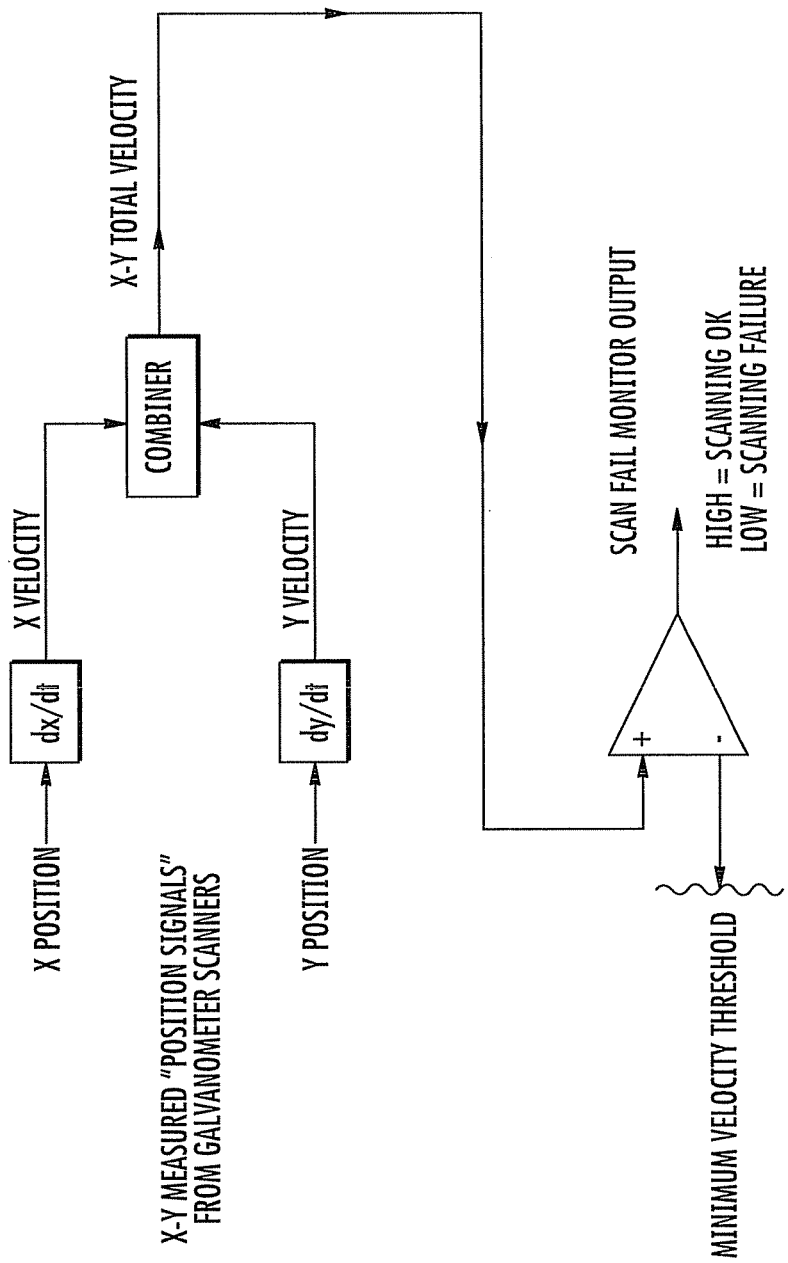
FIG. 5 is a schematic of a fail monitor for a laser projector.

Yet further, and as above described for audience scanning projectors, if the beam were to stop scanning, producing zero velocity, or if the velocity were to otherwise drop below some preset threshold, this would be considered a scanning failure. Under a scanning failure condition, the beam may be completely turned off by the light beam modulator or by a shutter. As above described, the scan-fail monitor may be an optional element within the system, but as illustrated with reference to FIG. 5, is often implemented.

Accordingly, within the drawings and specification, there have been disclosed typical preferred embodiments of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A laser projector for audience scanning, the laser projector comprising:
    a laser for emitting light beams;
    a scanner operable with the laser for receiving the light beams and scanning the light beams along X-Y vector coordinates within first and second scan fields; and
    a safety lens located downstream the scanner for receiving the scanned light beams substantially within only one of the first and the second scan fields, wherein the safety lens includes at least one optical power, and wherein the light beams downstream the safety lens having a first divergence are projected above a viewing audience and the light beams downstream the safety lens with a second divergence greater than the first divergence are projected into the audience; and
    a scan-fail monitor operable with the scanner, the scan-fail monitor emitting a fault signal which results in the emitted light beams from the laser reduced in power to a pre-selected level that is safe during a fault condition.

2. A laser projector for audience scanning, the laser projector comprising:
    a laser for emitting light beams;
    a scanner operable with the laser for receiving the light beams and scanning the light beams along X-Y vector coordinates within first and second scan fields; and
    a safety lens located downstream the scanner for receiving the scanned light beams substantially within only one of the first and the second scan fields, wherein the safety lens includes at least one optical power, and wherein the light beams downstream the safety lens having a first divergence are projected above a viewing audience and the light beams downstream the safety lens with a second divergence greater than the first divergence are projected into the audience;
    wherein the safety lens is formed from a simple lens having a central beam axis, wherein the simple lens is truncated along its central axis to form a half lens, and wherein a truncated edge portion of the half lens is generally aligned along a boundary defining the first and second scan fields to provide a change in beam divergence as the scanned beam move across the boundary between the first to the second scan fields.

3. The laser projector according to claim 2, wherein the simple lens is selected from a group consisting of biconvex, plano-convex, positive meniscus, negative meniscus, plano-concave and biconcave.

4. The laser projector according to claim 2, wherein the safety lens comprises a negative optical power thus increasing the divergence of the scanned beam transmitted therethrough.

5. The laser projector according to claim 2, wherein the safety lens comprises a positive optical power thus decreasing the divergence of the scanned beam transmitted therethrough.

6. A laser projector for audience scanning, the laser projector comprising:
    a laser for emitting light beams;
    a scanner operable with the laser for receiving the light beams and scanning the light beams along X-Y vector coordinates within first and second scan fields; and
    a safety lens located downstream the scanner for receiving the scanned light beams substantially within only one of the first and the second scan fields, wherein the safety lens includes at least one optical power, and wherein the light beams downstream the safety lens having a first divergence are projected above a viewing audience and the light beams downstream the safety lens with a second divergence greater than the first divergence are projected into the audience; and
    a second lens positioned upstream the scanner, wherein the second lens is characterized by a negative optical power, and wherein the safety lens is characterized by a positive optical power.

7. The laser projector according to claim 3, wherein the second lens comprises simple lens.

8. The laser projector according to claim 7, wherein the second lens is characterized by an optical power generally ranging between −0.5 to about −6.0 diopters, and wherein the safety lens is characterized by an optical power generally ranging between +0.5 to about +6.0 diopters.

9. The laser projector according to claim 8, wherein the second lens is characterized by an optical power of −2.0 diopters, and wherein the safety lens is characterized by an optical power of +2.0 diopters.

10. A laser projector for audience scanning, the laser projector comprising:
    a laser for emitting light beams;
    a scanner operable with the laser for receiving the light beams and scanning the light beams along X-Y vector coordinates within first and second scan fields; and
    a safety lens located downstream the scanner for receiving the scanned light beams substantially within only one of the first and the second scan fields, wherein the safety lens includes at least one optical power, and wherein the light beams downstream the safety lens having a first divergence are projected above a viewing audience and the light beams downstream the safety lens with a second divergence greater than the first divergence are projected into the audience;
    wherein the scan-fail monitor measures a scanning velocity of the beam and compares the scanning velocity to a pre-set minimum allowable velocity.

11. A laser projector for audience scanning, the laser projector comprising:
    a laser for emitting light beams;
    a scanner operable with the laser for receiving the light beams and scanning the light beams along X-Y vector coordinates within first and second scan fields; and
    a safety lens located downstream the scanner for receiving the scanned light beams substantially within only one of the first and the second scan fields, wherein the safety lens includes at least one optical power, and wherein the light beams downstream the safety lens having a first divergence are projected above a viewing audience and the light beams downstream the safety lens with a second divergence greater than the first divergence are projected into the audience;

wherein a horizon defines a boundary between the first and second scan fields, and wherein the audience is located below the horizon.

12. The laser projector according to claim 11, wherein at least one portion of the safety lens has a negative optical power.

13. The laser projector according to claim 11, wherein the safety lens is positioned above the horizon.

14. The laser projector according to claim 11, wherein the safety lens is positioned below the horizon.

15. The laser projector according to claim 11, wherein the scanner is an X-Y Galvanometer-based optical scanner.

16. A laser projector comprising:
a laser for emitting light beams;
a scanner operable with the laser for receiving the light beams and scanning the light beams within first and second scan fields; and
a safety lens positioned to receive the scanned light beams generally within only one of the first and the second scan fields, wherein the light beams passing through the safety lens having a first divergence are projected above a viewing audience and the light beams passing through the safety lens with a second divergence greater than the first divergence are projected into the audience;
wherein the safety lens is formed from a simple lens having a central beam axis, wherein the simple lens is truncated along its central axis to form a half lens, and wherein a truncated edge portion of the half lens is generally aligned along a boundary defining the first and second scan fields to provide a change in beam divergence as the scanned beam move across the boundary between the first to the second scan fields.

17. The laser projector according to claim 16, wherein the simple lens is selected from a group consisting of biconvex, plano-convex, positive meniscus, negative meniscus, plano-concave and biconcave.

18. The laser projector according to claim 16, wherein the safety lens comprises a negative optical power thus increasing the divergence of the scanned beam transmitted therethrough.

19. The laser projector according to claim 16, wherein the safety lens comprises a positive optical power thus decreasing the divergence of the scanned beam transmitted therethrough.

\* \* \* \* \*